(12) United States Patent
Chheda et al.

(10) Patent No.: US 6,804,530 B2
(45) Date of Patent: Oct. 12, 2004

(54) METHOD AND APPARATUS FOR DETECTION OF FORWARD AND REVERSE DTX MODE OF OPERATION DETECTION IN CDMA SYSTEMS

(75) Inventors: Ashvin H. Chheda, Plano, TX (US); Geng Wu, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 448 days.

(21) Appl. No.: 09/751,462

(22) Filed: Dec. 29, 2000

(65) Prior Publication Data
US 2002/0086692 A1 Jul. 4, 2002

(51) Int. Cl.[7] .............................. H04B 7/00; H04Q 7/20
(52) U.S. Cl. ...................... 455/522; 455/69; 455/67.11; 455/343.1
(58) Field of Search ........................ 465/522, 69, 67.11, 465/67.13, 517, 343.1, 343.2, 343.5, 68, 67.16, 70, 115.1, 115.3; 370/333, 318, 328, 311, 471

(56) References Cited

U.S. PATENT DOCUMENTS

| | | | | |
|---|---|---|---|---|
| 5,146,610 A | * | 9/1992 | Longshore et al. | 455/45 |
| 5,778,026 A | * | 7/1998 | Zak | 455/343.2 |
| 6,243,568 B1 | * | 6/2001 | Detlef et al. | 455/226.4 |
| 6,308,081 B1 | * | 10/2001 | Kolmonen | 455/522 |
| 6,463,042 B1 | * | 10/2002 | Paatelma | 370/318 |
| 6,510,409 B1 | * | 1/2003 | Su | 704/223 |
| 6,556,587 B1 | * | 4/2003 | Svanbro et al. | 370/471 |
| 6,654,613 B1 | * | 11/2003 | Maeng et al. | 455/522 |
| 6,654,922 B1 | * | 11/2003 | Numminen et al. | 714/748 |

* cited by examiner

Primary Examiner—Nick Corsaro
Assistant Examiner—John J Lee
(74) Attorney, Agent, or Firm—James A. Harrison; Bruce E. Garlick (57) ABSTRACT

A base station controller includes circuitry for determining whether a transmitter is transmitting in a DTX mode or operation for a supplemental channel in a CDMA network. The invention includes the steps of determining frame quality metrics for data received on a fundamental and a supplemental channel. If the frame quality metric is good, meaning that the number of errors is below a defined threshold, on the supplemental channel, then the mobile station is not, by definition, within a DTX mode of operation. However, if each of the base stations that are on the active list of base stations for the mobile station report that the mobile station frame quality metric is not below or within a specified threshold, then the base station performs a calculation to determine whether the mobile station is in a DTX mode of operation or is transmitting a null set. Specifically, the base station calculates a signal to noise ratio for the pilot channel as well as for the supplemental channel and compares or determines a ratio of these two calculations. If the ratio is within or below a specified threshold, then an erasure has occurred. If not, then the mobile station did transmit in a DTX mode of operation.

14 Claims, 5 Drawing Sheets

| | FCH FQM | SCH FQM | DTX MODE? |
|---|---|---|---|
| 1 | GOOD | GOOD | NO |
| 2 | BAD | GOOD | NO |
| 3 | GOOD | BAD | MAYBE |
| 4 | BAD | BAD | MAYBE |

METHOD AND APPARATUS FOR DETECTION OF FORWARD AND REVERSE DTX MODE OF OPERATION DETECTION IN CDMA SYSTEMS

BACKGROUND

1. Field of the Invention

The present invention relates generally to communications systems and particularly to power control in a code division multiple access communication system.

2. Description of Related Art

Because the radio frequency (RF) spectrum is limited, the government, more particularly, the Federal Communications Commission (FCC), governs the use of the radio frequency spectrum. This regulation includes deciding frequency band allocation among the various industries. Since the RF spectrum is limited, only a small portion of the spectrum can be assigned to each industry. Accordingly, the assigned spectrums must be used efficiently in order to allow as many frequency users as possible to have access to the spectrum.

Because the number and size of frequency bands are limited, multiple access modulation techniques are continuously being developed and improved to improve efficiency and capacity and to maximize use of the allocated RF spectrum. Examples of such modulation techniques include time division multiple access (TDMA), frequency division multiple access (FDMA), and code division multiple access (CDMA).

CDMA modulation employs a spread spectrum technique for the transmission of information. CDMA modulation techniques are becoming popular because they enable more users to communicate at a given time. A spread spectrum system uses a modulation technique that distributes the transmitted signal over a wide frequency band. This frequency band is typically substantially wider than the minimum bandwidth required for transmitting the signal. The spread spectrum technique is accomplished by modulating each baseband data signal to be transmitted with a unique wideband spreading code. Using this technique a signal having a bandwidth of only a few kilohertz can be spread over a bandwidth of more than a megahertz. A form of frequency diversity is obtained by spreading the transmitted signal over a wide frequency range. Since only 200–300 kHz of a signal is typically affected by a frequency selective fade, the remaining spectrum of the transmitted signal is unaffected. A receiver that receives the spread spectrum signal, therefore, will be affected less by the fade condition. In addition, spreading the signals over a large bandwidth allows system robustness against frequency selective interference, as the effect of the de-spreading process is to effectively dissipate the interference power over the entire bandwidth.

In a CDMA telephone system, multiple signals are transmitted at the same frequency. A particular receiver then determines which signal is intended for that receiver by the unique spreading code in the signal. The signals at that frequency without the particular spreading code intended for that particular receiver appear as noise to the receiver and are ignored. Because of this, it is desirable in CDMA systems to transmit at a minimum power level. Thus, CDMA systems typically employ power control algorithms to reduce the power transmission levels. By minimizing power transmission levels, interference to other signals is reduced and network capacity is maximized.

New generation CDMA communication networks are being formed to facilitate the transmission of large amounts of data on an as needed basis. Accordingly, a fundamental channel set is defined for transmitting on going communications between the base station transceiver systems and the mobile stations. Specifically, the fundamental channel can be used for control information in the form of messages, voice transmission, and even data transmission. Additionally, supplemental channels are being defined to transmit large amounts of data to and from a mobile station for use as needed. The supplemental channel can be configured at a number of different data rates, depending on the channel conditions, user profile, etc. The fundamental channel only works at one low data rate.

In next generation CDMA systems the supplemental channel is used for the transmission of large amounts of data on a non-periodic and predictable basis. The data rate is negotiated between the terminal and base station according to various radio resource management algorithms. Once the data rate is negotiated and the supplemental channel is set up, the data transfer commences.

Frame erasures that occur during the data transfers are handled by a combination of power control algorithms and a Radio Link Protocol process (RLP). The power control algorithm(s) ensures that the transmission power is sufficient for the current channel conditions to meet a specified frame error rate target. The RLP procedure uses a form of Automatic repeat request (ARQ) to facilitate the retransmission of bad frames.

As a part of the aforementioned data rate negotiations, the time for which the supplemental channel (SCH) is to remain active is also negotiated. The SCH active timer can be set to infinity or some other finite value (exact choice of parameters is based on the International Standards Organization (ISO) TIA IS2000 standard). As the mobile is transmitting data to the base station(s), it may run out of data to send, either because there is no more data to be sent or because there is some delay within the network.

When the system enters a state in which there is no data to send, an active timer starts, and will be reset when data transmission resumes, otherwise once the timer expires, the SCH data call is moved from the active state to the dormant state, where all resources are torn down. When there is no data to send on the supplemental channel, the terminal sends NULL frames to maintain the power control loop stability, but at the expense of wasted power. Alternatively the SCH can go into DTX (discontinuous transmission) mode, where nothing is sent.

A method or algorithm is needed, therefore, to detect when the SCH is in DTX mode to prevent instability in the power control loop and/or the RLP process. If the network cannot differentiate between the DTX frame (i.e. no frame) or an Erasure (i.e. bad frame) then the system could feedback to the terminal asking to increase power, and also increase various power control thresholds in the network, ultimately sacrificing capacity. Normally, in reverse link power control, the SCH power is controlled indirectly from the FCH. Typically, the SCH power to FCH power ratio is kept fixed. If FCH transmissions are subjected to an erasure, then the power of the FCH is increased thereby also increasing the power of the SCH. Generally, for example, the ratio of SCH to FCH power is kept such that if the FCH is operating at about a 1% frame error rate target while the SCH operates at about 5% frame error rate. Thus, if power for the FCH is increased, so to is the power of the SCH in the IS2000 Standard. Without DTX detection, however, this process is problematic.

An additional advantage of operating in the DTX mode lies on the fact that the mobile station can conserve power by using less power. This results in longer battery life as well as lower interference to other users. Assuming that the mobile station transmitting over a supplemental channel operates in the DTX mode, the base station cannot, under current designs, distinguish between an SCH frame erasure and a DTX mode of operation. The inability to make this distinction has an adverse affect on the higher radio link protocol (RLP) layers. For example, set points (threshold values for making power increase/decrease requests) used by a base station in its power control algorithm may be raised in response to a determination that a frame has been erased. Additionally, various algorithm enhancements, such as reverse link power control, may perform poorly if a base station is not able to detect the DTX mode of operation by the mobile station.

By way of example, if a base station is not aware that a mobile station is operating in a DTX mode of operation, the base station power control algorithms are likely to conclude that an erasure has occurred and that the mobile station should increase its transmission power levels. Accordingly, the base station generates, in this situation, power control commands to quickly increase the mobile station power transmission levels to receive a signal. Thereafter, because the signal to noise ratios for future further received signals will be above a specified threshold, the mobile station will be instructed to decrease power transmission levels.

In typical designs, however, a series of much smaller steps are used to decrease the transmission power level. The effect of this whole process is that, for a period of time, the mobile station transmits at a higher power level than is required thereby interfering with other carriers.

What is needed, therefore, is a system that enables a base station to determine when a mobile station is either transmitting a Null set or is operating in a DTX mode of operation.

SUMMARY OF THE INVENTION

The present system and method of use comprises a system that solves the aforementioned problems by, in part, monitoring a frame quality metric for both the fundamental channel and the supplemental channel. When a specified value(s) of frame quality metrics for the supplemental channel and fundamental channel is detected, the invention includes determining if an erasure has occurred or if the mobile is in a DTX mode.

More specifically, if each of the base stations receiving fundamental and supplemental channel data from a mobile station determine that the specified FER rate(s) have been observed, the invention includes an additional step of comparing an estimated delta offset value to an actual delta offset value. If the difference between the offset values is greater than a defined number, then the base station can conclude that the mobile station is operating in a DTX mode of operation. If the difference between the estimated delta offset value and the calculated (actual) delta offset value is less than or equal to the specified number then the base station can properly determine that an erasure of the signal has occurred.

The measured (actual) offset value is calculated by first calculating a signal to noise ratio for the pilot channel and then calculating a signal to noise ratio for the supplemental channel and then by dividing the calculated ratio for the pilot channel by the calculated ratio for the supplemental channel.

BRIEF DESCRIPTION OF THE DRAWINGS

FIGS. 2 and 3 illustrate typical data or voice patterns on the fundamental and supplemental channels in a reverse link transmission.

DETAILED DESCRIPTION OF THE DRAWINGS

Code Division Multiple Access communication systems generally comprise a circuitry for generating spread spectrum communication transmissions at a defined frequency by encoding, interleaving and scrambling data bits with long pseudo random number codes. Additionally, power control bits are "punctured" in a defined manner to enable a transceiver to request or advise whether power transmission levels require increasing or decreasing.

Figure 1A:
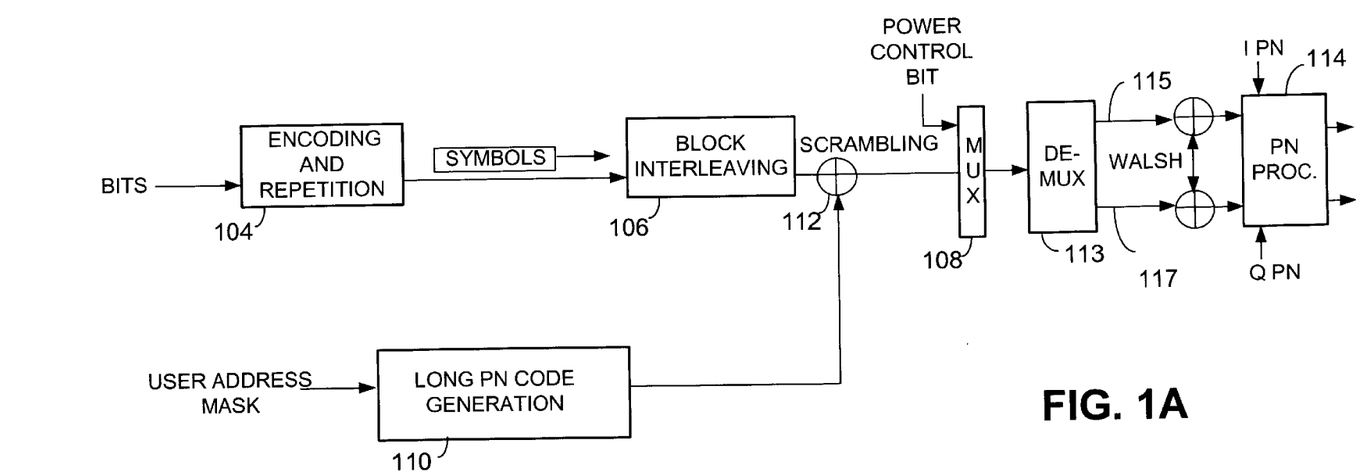
FIG. 1A is a functional block diagram that illustrates a typical CDMA transmitter system for use on the forward channel from a base station transceiver system (BTS) to a CDMA mobile station.

FIG. 1A illustrates a typical CDMA transmitter system for use on the forward channel from a base station transceiver system (BTS) to a CDMA mobile station. It is included herein as an overview of CDMA designs being implemented. An encoder 104 creates a digital baseband signal by encoding a digitized signal representing an analog voice or digital data service. An encoder 104 accepts data bits in and produces code symbols on an output. For each clock cycle, a new data bit is shifted into a register of the encoder 104 and the data bit previously received is output. The various inputs of an encoder are added (modulo 2) to produce two or more symbols out for each clock cycle. Since the new symbols generated for each clock cycle are derived from the values of the new bit being input in all current data bits occupying the shift register during a given interval, a certain level of predictability can be realized. The output symbols of the encoder 104 are then produced to a block interleaver 106. Block interleaver 106 serves to create a matrix of symbols wherein each matrix represents all of the information within a defined interval. For example, in one embodiment, 384 modulation symbols may be entered into an array at a rate of 19,200 symbols per second. The array is then rearranged to create an output array to de-correlate the data and to separate adjacent symbols in time.

One advantage of this process is that the effects of bursty errors may be diminished and information eliminated by the bursty error may potentially be recovered. Moreover, in some embodiments, lower transmission rate data is repeated. Here, the lower rate repeated symbols are also separated therefore increasing the survivability of symbols to signal bit errors. In addition, the data array that is output by the block interleaver 106 is slightly modified in that defined power control bits are inserted in place of various data symbols. Power control bits are used by CDMA transmitters to indicate that power transmission levels of the transceiver with which the transmitter is communicating need to be increased or decreased. Generally, the power control bits are used for power control purposes to optimize network effectiveness.

Each symbol that is output from the multiplexer 108 is produced to a de-multiplexer 113, which passes the input bits alternately to an in-phase branch 115 and a quadrature branch 117. Each symbol that is output from the de-multiplexer 113 is exclusively ORed with an assigned Walsh function. The Walsh function is what, in a CDMA context, creates the channels of communication. Stated simply, each symbol is added across a defined bit sequence Continuing to refer to FIG. 1, a long PN code generator 110 generates long pseudo random number (PN) sequences to generate user-specific sequences of symbols. The Walsh code spread symbols from the combiner 112 are then spread in quadrature. The symbols are input to two Exclusive OR combiners to generate a pair of short PN sequences. The first combiner exclusively ORs the Walsh code spread symbols on the in-phase branch 115 with the end phase sequence while the second combiner exclusively ORs the Walsh code spread symbols on the branch 117 with the quadrature phase (I) and (Q) sequences. The I and Q sequences are then produced to a PN processor 114 that, in turn, produces the final In Phase and Quadrature chip sequences for transmission.

The resulting I and Q channel code spread sequences are used to bi-phase modulate a quadrature pair of sinusoids by driving the power level of the pair of sinusoids. The sinusoidal output signals are then processed for transmission by an antenna.

Figure 1B:
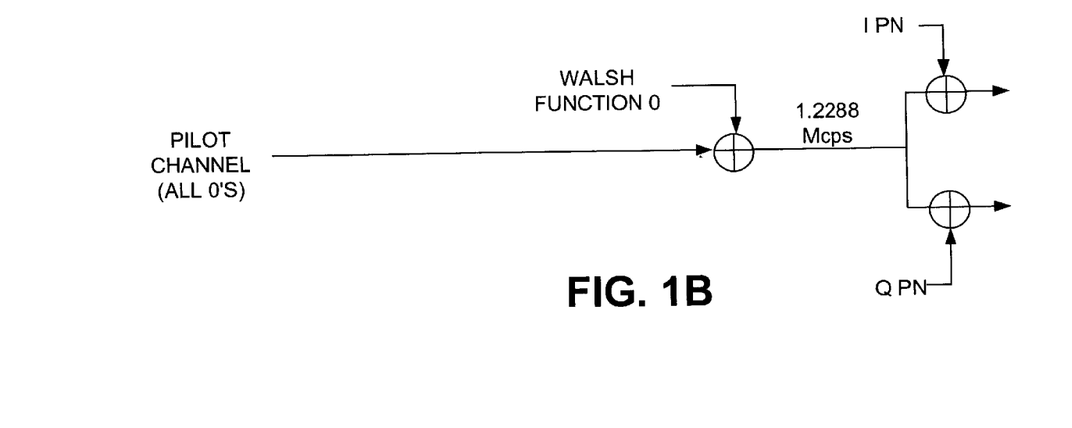
FIG. 1B is a functional block diagram illustrating the operation of a pilot channel.

FIG. 1B is a functional block diagram illustrating the operation of a forward link pilot channel. The pilot channel is a reference channel transmitted on the forward link that mobile stations use for acquisition, timing, and as a phase reference for coherent demodulation. The pilot channel signal is transmitted at all times by each base station on each active CDMA frequency. Each mobile station continuously tracks the pilot signal. Unlike long code sequences, pilot channel sequences are repeated many times every few seconds. For example, in one known system, the pilot sequence is repeated 75 times every two seconds. Not only does this aid a mobile station in its initial acquisition when it powers up, but also ensures rapid detection of cells or base station transceiver systems that form good handoff candidates.

All base stations share the same PN sequence for the pilot channel. However, each base station transmits the pilot channel at a unique phase offset value. Thus, the timing of the pilot channel provides tracking of a timing reference for a given base station and phase reference. The phase separation provides for extremely high reuse within one CDMA channel frequency. The uncoded nature of the pilot signal facilitates acquisition by the mobile stations in addition to the short duration of the pilot PN sequence.

In one described embodiment, the pilot channel is sent unmodulated, and is orthogonally spread with a Walsh function zero to ensure that it is easily recognized. Quadrature spreading and channel filtering occur exactly as discussed for all forward channel traffic.

Figure 2:
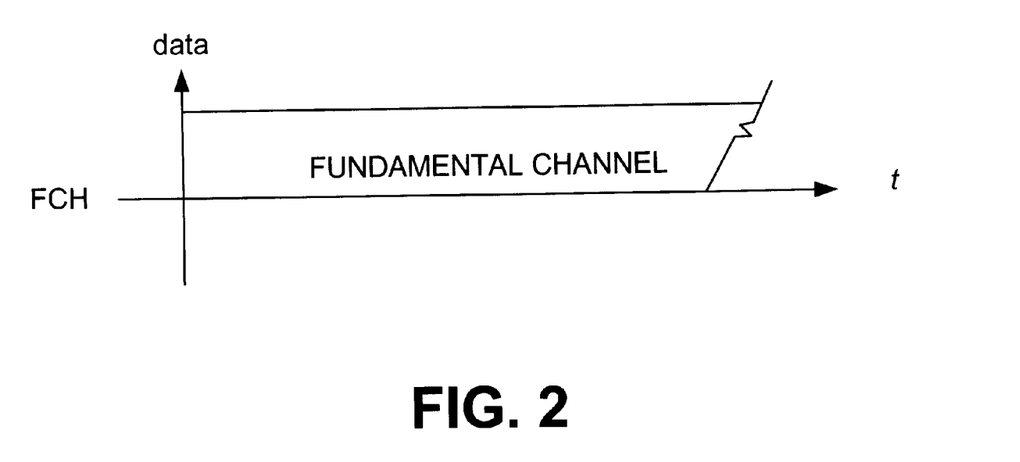
FIG. 2 is a functional block diagram that illustrates a typical CDMA transmitter system for use on the reverse channel from a CDMA mobile station to a BTS.
Figure 3:
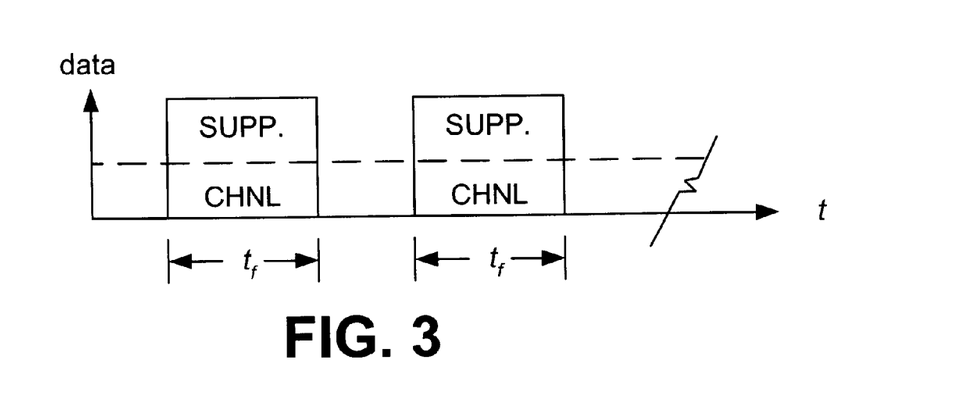

FIGS. 2 and 3 illustrate exemplary data or voice patterns on the fundamental and supplemental channels in a reverse link transmission. Referring to FIG. 2, it may be seen that a fundamental channel typically transmits data or voice continuously while a call is connected or a communication link is established. Even if the FCH has no data to send (either no control information or no voice), then it still transmits frames but at an eighth rate rather than at a full rate, i.e. at 1500 b/sec rather than 9600 b/sec. While the eighth rate is not transmitting useful information, it serves to maintain the power control and various other loops.

FIG. 3 illustrates, however, that a supplemental channel only transmits data periodically. More specifically, the supplemental channel is used to transmit data whenever there is a need to carry excess information from the mobile station to the base station over the reverse link, or when the user is requesting data transmission at a very high data rate. For each of the supplemental transmissions shown in FIG. 3, each transmission is shown to last the period represented by $t_f$.

Regarding reverse link power control, prior CDMA networks did not define signals for enabling the mobile station to request power changes. In new versions of CDMA that are being implemented, however, a signal has been defined for reverse link power control. In one network under design, a pilot channel is transmitted having time division multiplexing characteristics in which a power control signal is defined. Other approaches, however, may also be implemented.

Figure 4:
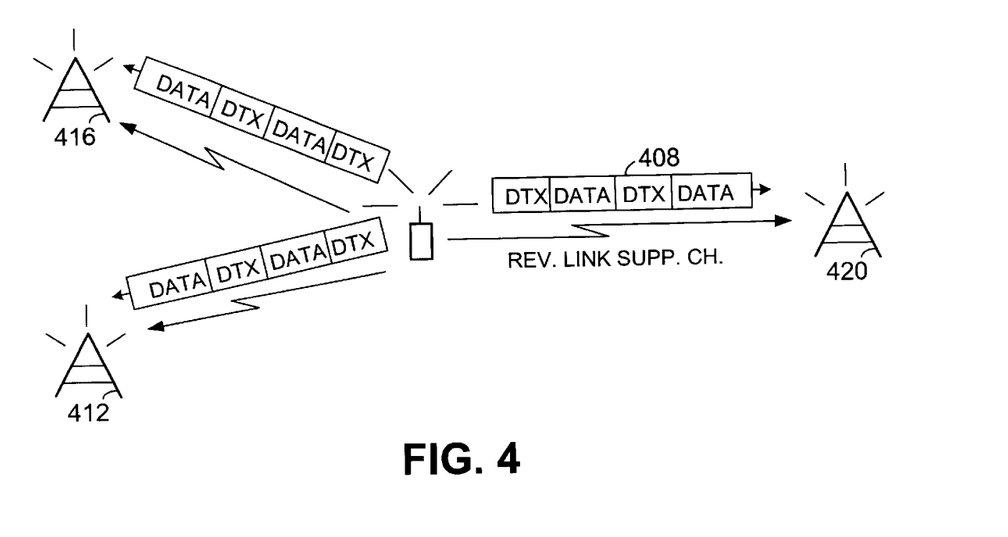
FIG. 4 is a functional block diagram of a code division multiple access network in which three base station transceiver system antennas are receiving the reverse link transmissions by a mobile station over a reverse link supplemental channel.

FIG. 4 is a functional block diagram of a code division multiple access network in which three base station transceiver system antennas are receiving the reverse link transmissions by a mobile station over a reverse link supplemental channel. More specifically, as may be seen, a mobile station 404 transmits two blocks of data, shown generally at 408 to the code division multiple access network base station transceiver system antennas. As may be seen, in the system of FIG. 4, three base station transceiver system antennas receive the data frames 408. More specifically, antennas 412, 416, and 420 and their corresponding base station transceiver systems (not shown) receive the data frames 408 over the reverse link supplemental channel. As is understood by those skilled in the art, in the example herein, each of the antennas and their corresponding base station transceiver systems are those that are on an active list of base stations for the mobile station 404. Examining data blocks 408 more carefully, it may be seen that the block consists of a burst of data frames separated by DTX intervals. The base station of the present invention is capable of determining that the data frames include the DTX portions thereby enabling the base station to ensure stability of the various algorithms that depend on this information.

Figure 5:
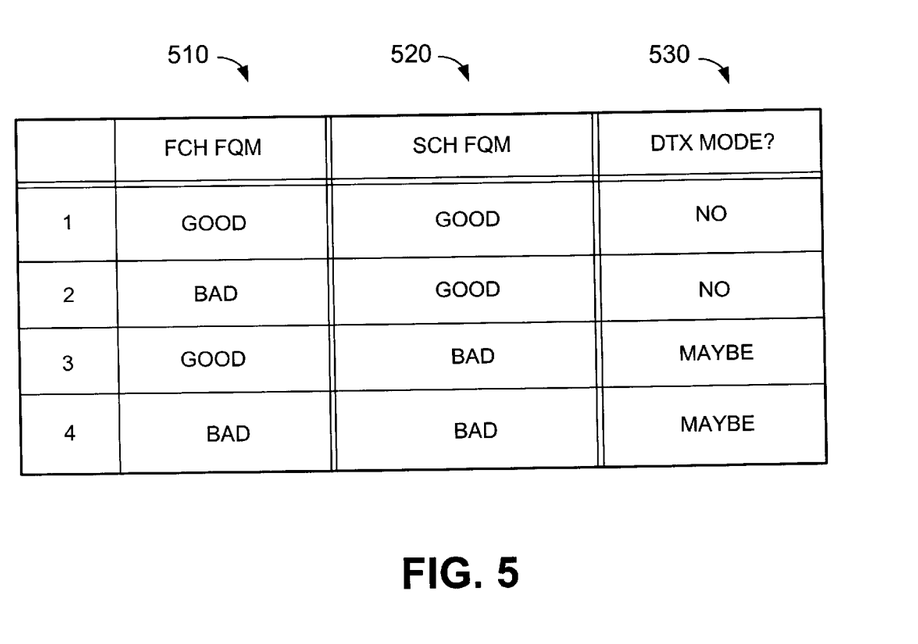
FIG. 5 is a table illustrating a portion of an algorithm performed by a base station to determine whether an erasure has occurred or whether a mobile station is within a DTX mode of operation.

FIG. 5 is a table illustrating a portion of an algorithm performed by a base station to determine whether an erasure has occurred or whether a mobile station is within DTX mode of operation. Referring now to FIG. 5, three columns and four rows of data are shown. More specifically, the column shown generally at 510 is for listing the fundamental channel frame quality metric determination, namely listing whether the frame quality metric is good or bad according to whether it is within an acceptable threshold or not. The column shown generally at 520 indicates whether the frame quality metric for the supplemental channel is either good or bad. An SCH channel frame is sometimes made up of various LTU frames, or "frames within a frame." In other words there can be one, two, four, etc, LTU frames within the 20 ms frame, any of these frames could be good, or some of them could be bad. The BAD in the column should be taken to mean none of these LTU frames are GOOD, if even one is GOOD then the frame is considered GOOD for the purposes of the DTX detection algorithm.

The column shown generally at 530 is to indicate, based upon the combinations of data from each row for the columns 510 and 520, whether it is possible that the transmitter (here, a mobile station) is in a DTX mode. As may be seen, for rows one and two, wherein the supplemental channel frame quality metric is good, it is not possible that the transmitter is in a DTX mode of operation. Stated differently, it cannot be, as a matter of definition, in a DTX mode of operation because a lack of data of a DTX mode or operation would not lead to the receiver (here, a base station) determining that the transmitter is/was in a DTX mode of operation because the supplemental channel frame quality metric is good. Thus, if the data in column 520 is good, it does not matter whether the fundamental channel frame quality metric is good or bad.

With respect to the data of rows three and four, however, one may note that the supplemental channel frame quality metric is bad for both rows. Stated differently, frame quality metric is below a defined threshold possibly indicating, for the supplemental channel, that the transmitter is in a DTX mode of operation.

In an exemplary embodiment of the invention shown in FIG. 5, if a base station controller is analyzing the data received by plurality of base station transceiver systems, additional logic may be implemented. For example, and referring again to FIG. 4, if the base station transceiver system coupled to antenna 412 receives a good supplemental channel frame quality metric while the base station transceiver system coupled to antennas 416 and 420 receive a bad frame quality metric for the supplemental channel for mobile station 404, the base station controller will conclude that the mobile station did transmit data and therefore is not in a DTX mode of operation. Thus, an erasure occurred with respect to the data received or that should have been received through antennas 416 and 420. For the frame quality metric to be set to BAD for the supplemental channel, as shown in rows three and four of FIG. 5, none of the base station transceiver systems, in this embodiment, would have received or did receive data from the mobile station having frame quality metric that was within a specified threshold value.

Referring again to column 530 of FIG. 5, for rows one and two, the mobile station is not in a DTX mode of operation, but as shown in rows three and four, it may be in a DTX mode of operation. Thus, further calculations must be made. For rows 3 and 4, the BS will only conclude that the mobile is in a DTX mode if none of the active BTSs received a signal having an adequate signal quality on the Supplemental Channel.

Figure 6:
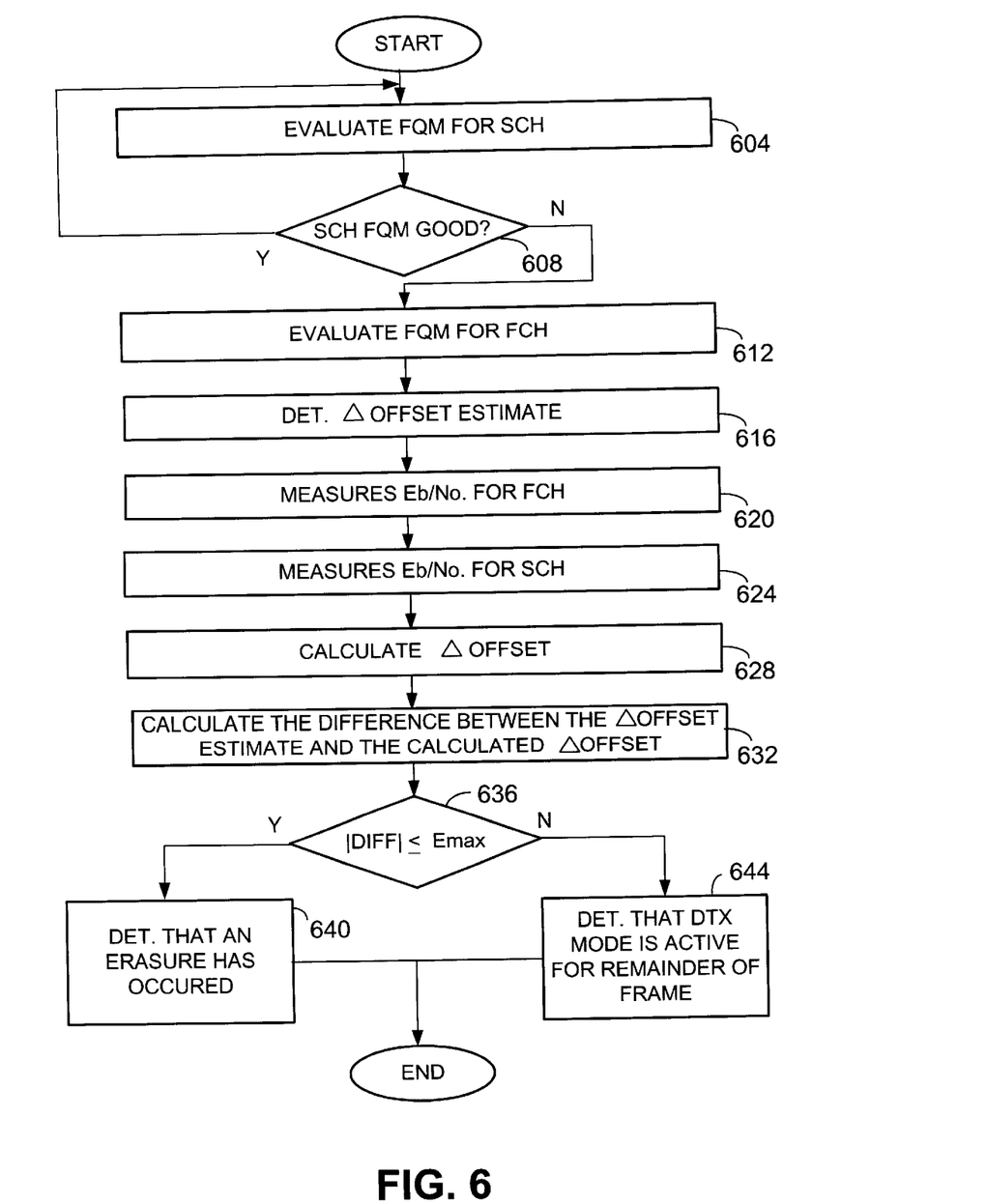
FIG. 6 is a flow chart illustrating a method for determining whether a mobile station is in a DTX mode of operation for the remainder of a supplemental channel frame.

FIG. 6 is a flow chart illustrating a method for determining whether a mobile station is in a DTX mode of operation for the remainder of a supplemental channel frame or whether it entered into a DTX mode of operation during the last SCH frame. Initially, a base station calculates a frame quality metric for the supplemental channel data to determine whether the mobile station possibly went into a DTX mode of operation (step 604). Thus, the base station determines whether the supplemental channel frame quality metric is within a specified threshold, meaning that it is good, or not (step 608).

If one or more base stations on the mobile station active list report that the FQM is good, then it is considered good for the purpose of step 608. In other words, even if same base station reports a bad FQM for the supplemental channel, the SCH FQM is still good if it was good for one or more base stations. If the supplemental channel frame quality metric is good, meaning it is within a specified threshold, then the remaining process steps are complete and the system resumes with step 604. If the supplemental channel frame quality metric is not good, however, then the base station determines the frame quality metric for the fundamental channel (step 612).

The method for determining the frame quality metric for the fundamental channel, or the supplemental channel, can be one of any different known method for making such determinations.

Thereafter, the base station determines a delta offset estimate (step 616). Typically, the delta-offset estimate is a defined number for a supplemental channel. Thereafter, the base station measures the signal to noise ratio for the pilot channel (step 620) as well as for the supplemental channel (step 624). The signal to noise ratios for each of these channels, namely the pilot and supplemental channel are used to calculate an actual delta offset. Thus, the next step includes calculating an actual delta offset value (step 628). In the present inventive method, the delta offset values calculated by the following formula $\Delta$ OFFSET=($E_c/N_o$ for the measured pilot signal)/($E_c/N_o$ for the measured supplemental channel).

Once the actual delta offset value is calculated, the base station compares the actual expected offset to the calculated offset values to determine the difference there between (step 632). If the absolute value of that difference is less than or equal to a defined number, then an erasure condition has occurred. However, if the absolute value of the difference in the offsets is greater than the specified number, then the mobile station entered into a DTX mode of operation or transmitted a Null set. Thus, the base station next examines the absolute value of the difference in the delta offsets to determine whether it is less than or equal to a defined number E-Max (step 636). If it is less than or equal to E-Max, the base station determines that an erasure has occurred (step 640). If it is not less than or equal to E-Max, the base station determines that the mobile station entered into a DTX mode of operation (step 644).

Figure 7:
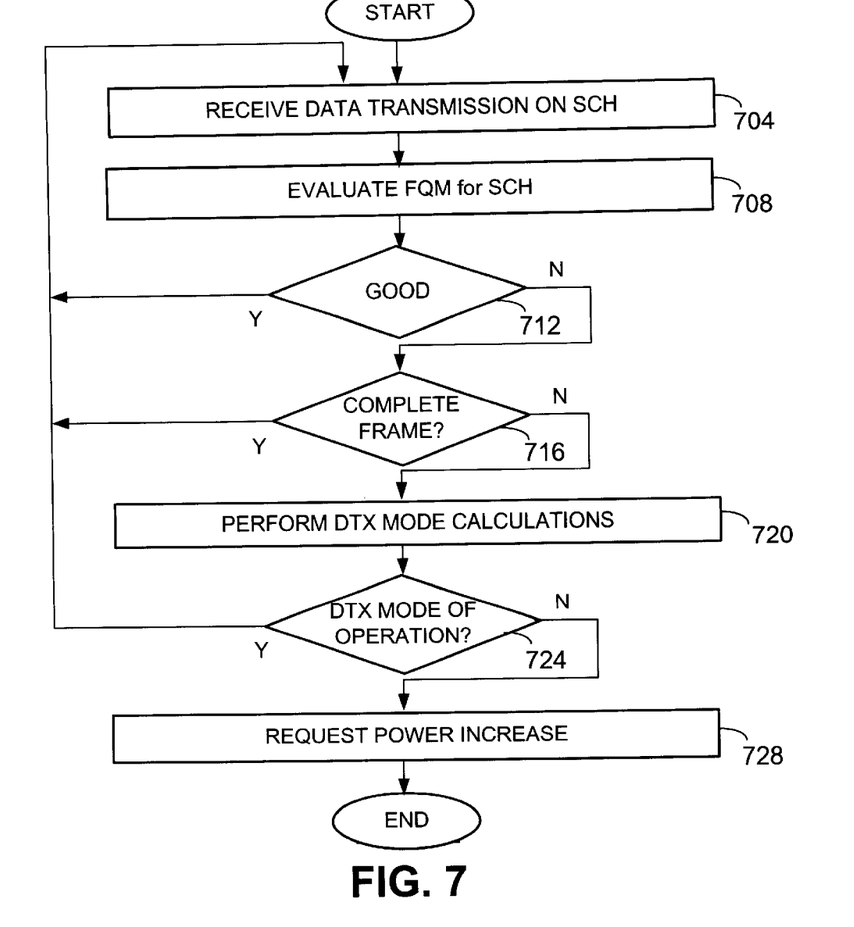
FIG. 7 is a flow chart illustrating a method for power control according to one embodiment of the present invention.

FIG. 7 is a flow chart illustrating a method for power control according to one embodiment of the present invention. Initially, a base station receives a data transmission on the supplemental channel from a mobile station (step 704). Thereafter, the base station evaluates the frame quality metric for the supplemental channel (step 708). Thereafter, the base station determines whether the evaluated frame quality metric is within a specified threshold (step 712).

For example, if it is within the specified threshold, then the procedure is restarted with step 704. If it is not within the specified threshold, meaning it is not good, the next step in the method determines whether the transmission of the frame is complete (step 716). If it is complete, the process is reinitiated with step 704. If it is not complete, then the base station performs DTX mode calculations as described herein this application (step 720). For example, the base station calculates an offset value and compares it to a stored value. These offset value calculations include evaluating signal to noise ratios in one embodiment of the invention.

Thereafter, the base station determines whether the mobile station is in a DTX mode of operation (step 724). If it is not in a DTX mode of operation, then the base station requests a power increase. On the other hand, if it is in a DTX mode of operation, it inhibits power increase requests (step 728).

Figure 8:
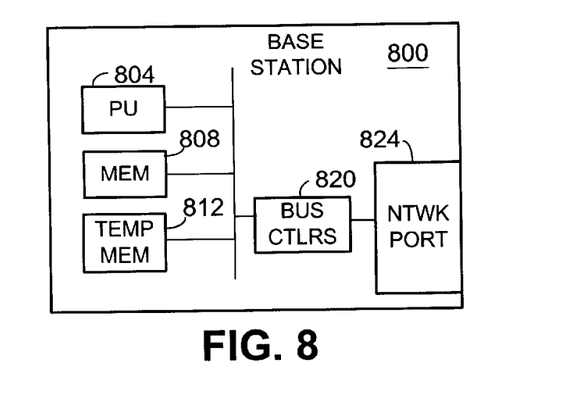
FIG. 8 is a functional block diagram of a base station controller according to one embodiment of the present invention.

FIG. 8 is a functional block diagram of a base station controller according to one embodiment of the present invention. Referring to FIG. 8, it may be seen that a base station controller (BSC) 800 includes a processing unit 804, a memory 808, and a temporary memory 812. Memory 808 is for storing computer instructions that define the operational logic that includes the inventive methods described herein this application. Temporary memory 812 is for temporarily holding data that is created during the execution of the computer instructions within memory 808 by a processing unit 804. Thus, as may be seen, processing unit 804 is coupled to receive computer instructions from memory 808 that define operation logic for BSC 800. Processing unit 804 also is coupled to transmit and receive to and from temporary memory 812 specific data that has been temporarily stored over a bus 816. In addition, a bus controller 820 is coupled to bus 816 and a network port 824 is coupled to the bus controller 820. Bus controller 820 is for controlling bus operation as well as transmissions through port 824.

Accordingly, processing unit 804, in executing the computer instructions stored within memory 808, may communicate with bus controller 820 to transmit or receive data through network port 824. Thus, for example, if the processing unit determines that the mobile station is not in a DTX mode of operation, then the computer instructions within memory 808, when executed by processing unit 804, may cause BSC 800 to transmit a power increase request in a defined power control signal to the mobile station by way of a base station transceiver system.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents, and alternatives falling within the spirit and scope of the present invention as defined by the claims. For example, the circuitry described herein may be formed of electrical or optical components or a combination thereof. Additionally, the logic of the above-described invention may be formed in hardware or defined by computer instructions stored in memory and executed by a processor.

For example, the inventive principles may also be used with respect to other channels as a part of its power control algorithms. By way of example, offset values that compare signal to noise ratios for digital control channels, paging channels and supplemental channels may be used in an alternative approach for determining if an erasure has occurred. For these embodiments, the stored and expected offset values may differ according to the system configuration. Finally, the inventive methods and apparatus may be used to detect DTX operation on the forward link. Thus, a mobile may use the disclosed basic algorithm to determine that a base station is operating in a DTX mode and that no erasure is occurring to avoid having the mobile request an increase in transmission power levels for the forward link. As may be seen, the described embodiments may be modified in many different ways without departing from the scope or teachings of the invention.

What is claimed is:

1. A base station in communication with a mobile station, comprising:
   circuitry that defines logic that prompts the circuitry to compare signal quality metrics of first and second channels to determine whether the mobile station is in a DTX mode of operation;
   wherein the circuitry determines that the mobile station was not in a DTX mode of operation if the difference between the stored offset value and the calculated offset value is less than or equal to a specified threshold value; and
   circuitry that defines logic to prompt the base station to transmit a signal to prompt the mobile station to increase transmission power levels whenever the base station has not received data for a part of a transmission period and has determined that the mobile station is not in a DTX mode of operation.

2. The base station of claim 1 wherein the circuitry defines logic for determining whether any base station transceiver system received data over the supplemental channel having a good frame quality metric as a part of determining whether the mobile station was in a DTX mode of operation.

3. The circuitry of claim 2 further defining logic to prompt the base station to calculate a specified offset value.

4. The circuitry of claim 3 further defining logic to cause the base station controller to compare the calculated offset value to a stored offset value to determine whether the mobile station entered into a DTX mode of operation.

5. The circuitry of claim 4 further defining logic to prompt the base station controller to request a power increase if it determined that the mobile station was not in a DTX mode of operation.

6. A method for determining whether to instruct a mobile station to increase transmission power levels, comprising:
   evaluating a frame quality metric for a received data frame that was transmitted over a supplemental channel;
   determining whether the mobile station entered into a DTX mode of operation;
   wherein the step of determining whether the mobile station was not in a DTX mode of operation includes the step of calculating an offset value by comparing signal to noise ratios for a fundamental channel and the supplemental channel to a stored offset value;
   wherein the step of determining whether the mobile station was not in a DTX mode of operation includes determining that the mobile station was not in a DTX mode of operation if the difference between the stored offset value and the calculated offset value is less than or equal to a specified threshold value; and
   transmitting a request to the mobile station to increase transmission power levels if the mobile was not in a DTX mode of operation and if the evaluated frame quality metric is below a specified threshold.

7. A method in a wireless network for determining whether to request power control transmission level increases on a channel from a transmitter, comprising:
   receiving signal transmissions on a first channel and on a second channel from the transmitter;
   determining the frame quality metric for the data received on the first and second channels;
   determining whether the frame quality metrics for the first and second channels were good or bad;
   determining whether the transmitter transmitted data in a DTX mode of operation by evaluating the determined frame quality metrics to determine if an erasure could have occurred and, if so, performing additional calculations to determine whether an erasure occurred or whether the mobile transmitted in a DTX mode; and wherein the step of determining whether the transmitter transmitted data in a DTX mode of operation includes determining that the mobile station was in a DTX mode of operation if the difference between the stored offset value and the calculated offset value is greater than or equal to a specified threshold value.

8. The method of claim 7 wherein the transmitter is a mobile station and wherein the step of determining whether the transmitter transmitted in a DTX mode of operation wherein includes the step of determining that the mobile station did not transmit in a DTX mode of operation if any one of a plurality of base station transceiver systems received data on the second channel from the mobile station having a good frame quality metric.

9. The method of claim 7 further comprising the step of evaluating signal to noise ratios on the first and second channels as a part of determining whether the transmitter transmitted in a DTX mode of operation.

10. The method of claim 7 further comprising the step of calculating an offset value for the first and second channels.

11. The method of claim 10 wherein the first channel is a paging channel and the second channel is a supplemental channel.

12. The method of claim 10 wherein the first channel is a digital control channel and the second channel is a supplemental channel.

13. The method of claim 10 wherein the first channel is a fundamental channel and the second channel is a supplemental channel.

14. The method of claim 7 wherein the first channel is one of a digital control channel, a paging channel or a fundamental channel and the second channel is a supplemental channel.

* * * * *